United States Patent
Zhao et al.

(10) Patent No.: US 10,819,224 B2
(45) Date of Patent: Oct. 27, 2020

(54) POWER FACTOR CORRECTION CIRCUIT, CONTROL METHOD AND CONTROLLER

(71) Applicant: Silergy Semiconductor Technology (Hangzhou) LTD, Hangzhou, ZheJiang Province (CN)

(72) Inventors: Chen Zhao, Hangzhou (CN); Zhaofeng Wang, Hangzhou (CN); Xiaodong Huang, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 0 days.

(21) Appl. No.: 16/512,542

(22) Filed: Jul. 16, 2019

(65) Prior Publication Data

US 2019/0341842 A1  Nov. 7, 2019

Related U.S. Application Data

(63) Continuation of application No. 15/911,376, filed on Mar. 5, 2018, now Pat. No. 10,396,655.

(51) Int. Cl.
*H02M 1/42* (2007.01)
*H02M 1/44* (2007.01)
*H02M 1/00* (2006.01)
*H05B 45/37* (2020.01)

(52) U.S. Cl.
CPC ........... *H02M 1/4225* (2013.01); *H02M 1/44* (2013.01); *H05B 45/37* (2020.01); *Y02B 70/126* (2013.01); *Y02P 80/112* (2015.11)

(58) Field of Classification Search
CPC .... H02M 1/42; H02M 1/4208; H02M 1/4425; H02M 1/425; H02M 1/44; H02M 2001/0022
See application file for complete search history.

(56) References Cited

U.S. PATENT DOCUMENTS

| | | | |
|---|---|---|---|
| 6,756,771 B1 | 6/2004 | Ball et al. | |
| 7,123,494 B2 | 10/2006 | Turchi | |
| 7,313,007 B2 | 12/2007 | Wu et al. | |
| 8,674,544 B2* | 3/2014 | Rada | G05F 1/70 307/38 |
| 8,736,236 B2 | 5/2014 | Sun et al. | |
| 9,246,381 B2 | 1/2016 | Xu | |
| 9,692,294 B2* | 6/2017 | Jiang | H02M 1/4225 |
| 2006/0119337 A1 | 6/2006 | Takahashi et al. | |
| 2010/0187914 A1* | 7/2010 | Rada | G05F 1/70 307/105 |
| 2010/0246226 A1 | 9/2010 | Ku et al. | |
| 2011/0221402 A1 | 9/2011 | Park et al. | |

(Continued)

*Primary Examiner* — Thienvu V Tran
*Assistant Examiner* — Sisay G Tiku
(74) *Attorney, Agent, or Firm* — Michael C. Stephens, Jr.

(57) ABSTRACT

A power factor correction circuit can include: a power meter configured to measure a power factor at an input port; a switching-type regulator that is controllable by a switching control signal in order to adjust the power factor of an input AC power; an EMI filter disposed between the switching-type regulator and the input port; and a controller configured to generate the switching control signal to maximize the power factor by adjusting a current reference signal according to a measured power factor, where the current reference signal represents an expected inductor current of the switching-type regulator.

16 Claims, 9 Drawing Sheets

(56) References Cited

U.S. PATENT DOCUMENTS

| | | | |
|---|---|---|---|
| 2013/0043847 A1* | 2/2013 | Kim | H02M 1/4225 |
| | | | 323/207 |
| 2014/0160815 A1 | 6/2014 | Jeong et al. | |
| 2015/0023067 A1 | 1/2015 | Terasawa | |
| 2016/0065054 A1 | 3/2016 | Li et al. | |
| 2016/0190912 A1* | 6/2016 | Lim | G01R 21/006 |
| | | | 363/84 |
| 2017/0181234 A1 | 6/2017 | Huang et al. | |
| 2017/0250620 A1 | 8/2017 | White et al. | |
| 2018/0269779 A1* | 9/2018 | Wang | H02M 1/4225 |
| 2018/0278150 A1* | 9/2018 | Zhao | H02M 1/44 |

\* cited by examiner

POWER FACTOR CORRECTION CIRCUIT, CONTROL METHOD AND CONTROLLER

RELATED APPLICATIONS

This application is a continuation of the following application, U.S. patent application Ser. No. 15/911,376, filed on Mar. 5, 2018, and which is hereby incorporated by reference as if it is set forth in full in this specification, and which also claims the benefit of Chinese Patent Application No. 201710174980.0, filed on Mar. 22, 2017, which is incorporated herein by reference in its entirety.

FIELD OF THE INVENTION

The present invention generally relates to the field of power electronics, and more particularly to power factor correction circuits, and associated methods and controllers.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Figure 1:
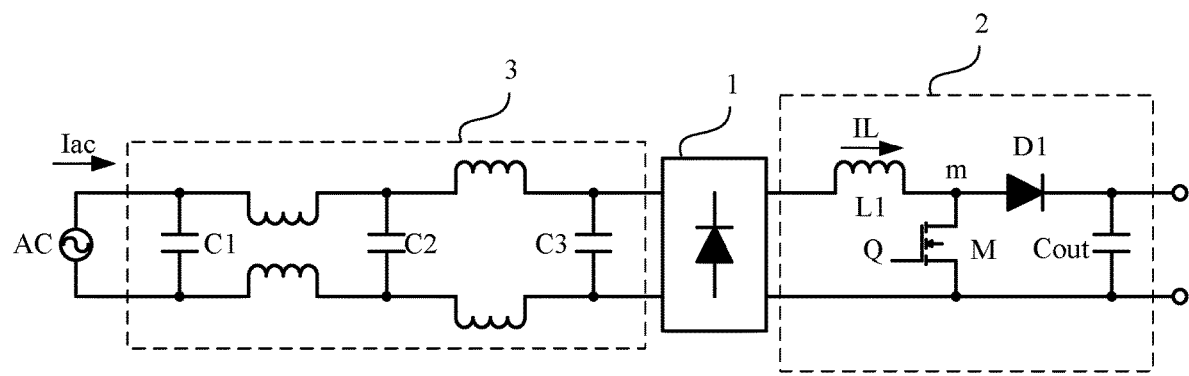
FIG. 1 is a schematic block diagram of an example power stage circuit of a power factor correction circuit, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Power factor (PF) is the cosine of the phase difference between a voltage and a current, and can also be expressed as the ratio of effective power to apparent power. The power factor is a parameter that is generally used to measure the efficiency of electrical equipment, such as switching power supplies. The phase difference between the voltage and current can be eliminated or reduced by performing a power factor correction (PFC) operation. This can improve the power factor of the system, the transmission efficiency of active power, and the overall grid environment.

An active power factor correction circuit may typically rely on relatively fast input current closed-loop regulation, in order to make the input current track the sinusoidal AC input voltage in real-time, so as to realize power factor correction. Electromagnetic interference (EMI) filters can be provided at the AC input side in order to enhance the immunity of the circuit to interference. This can lead to a reduction of the power factor, which may be particularly noticeable under half-load or light-load conditions. In some approaches, corresponding capacitive current compensation control may be utilized in the design phase for the AC side EMI filter that may be adopted, thereby achieving better performance of the PFC circuit under different load conditions.

In one embodiment, a power factor correction circuit can include: (i) a power meter configured to measure a power factor at an input port; (ii) a switching-type regulator that is controllable by a switching control signal in order to adjust the power factor of an input AC power; (iii) an EMI filter disposed between the switching-type regulator and the input port; and (iv) a controller configured to generate the switching control signal to maximize the power factor by adjusting a current reference signal according to a measured power factor, where the current reference signal represents an expected inductor current of the switching-type regulator.

Referring now to FIG. 1, shown is a schematic block diagram of an example power stage circuit of a power factor correction circuit, in accordance with embodiments of the present invention. In this particular example, the power stage circuit can include rectifier circuit 1, switching-type regulator 2 and EMI filter 3. Rectifier circuit 1 can convert AC current Iac of input source AC to a DC current. Rectifier circuit 1 can be implemented by any suitable rectifier circuitry, such as a half-bridge rectifier circuit or a full-bridge rectifier circuit. Switching-type regulator 2 may be controlled by switching control signal Q to perform power factor correction.

While switching-type regulator 2 is shown in the example of FIG. 1 as having a BOOST topology, any suitable converter topology (e.g., BUCK, BUCK-BOOST, FLYBACK, etc.) can be employed in certain embodiments. In this particular example, switching-type regulator 2 can include inductor L1, switch M, diode D1, and capacitor Cout. Inductor L1 can connect between an input terminal and intermediate terminal "m." Switch M can connect between intermediate terminal "m" and ground. Diode D1 can connect between intermediate terminal "m" and an output terminal, for rectifying the current from inductor L. Capacitor Cout can connect between the output terminal and ground, for filtering an output voltage. Switch M may be controlled by switching control signal Q to switch between ON and OFF states, in order to control the inductor current, and to actively perform power factor correction.

EMI filter 3 may be disposed between rectifier circuit 1 and AC input port AC, in order prevent interference on the AC power grid that may be caused by the high frequency switching of switching regulator 1. EMI filter 3 can include a pair of common mode inductors, a pair of differential mode inductors, and capacitors C1-C3 coupled between the terminals of the inductors. EMI filter 3 can be equivalent to capacitor Cemi since the inductors in EMI filter 3 may not substantially affect the input current phase. The capacitance value of capacitor Cemi can equal to a sum of the capacitance values of capacitors C1-C3.

Figure 2:
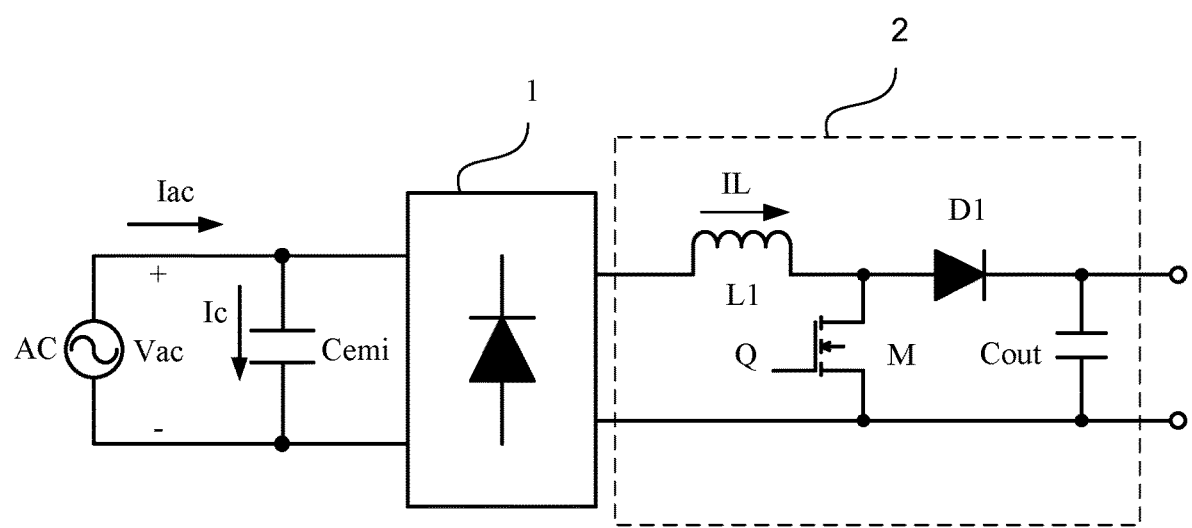
FIG. 2 is an equivalent circuit diagram of an example power stage circuit of a power factor correction circuit, in accordance with embodiments of the present invention.

Referring now to FIG. 2, shown is an equivalent circuit diagram of an example power stage circuit of a power factor correction circuit, in accordance with embodiments of the present invention. Here, the power stage circuit in FIG. 1 can be simplified as the equivalent circuit in FIG. 2. In this particular example, a portion of input AC current Iac may flow to rectifier circuit 1, and the other portion can be shunted by capacitor Cemi. Inductor current IL may satisfy IL=|Iac−Ic| since rectifier circuit 1 may not change the amplitude of the AC current. In the equivalent circuit shown in FIG. 2, because capacitor Cemi is coupled in parallel to the input port, the phase of input current Iac may lead that of input voltage Vac.

Figure 3:
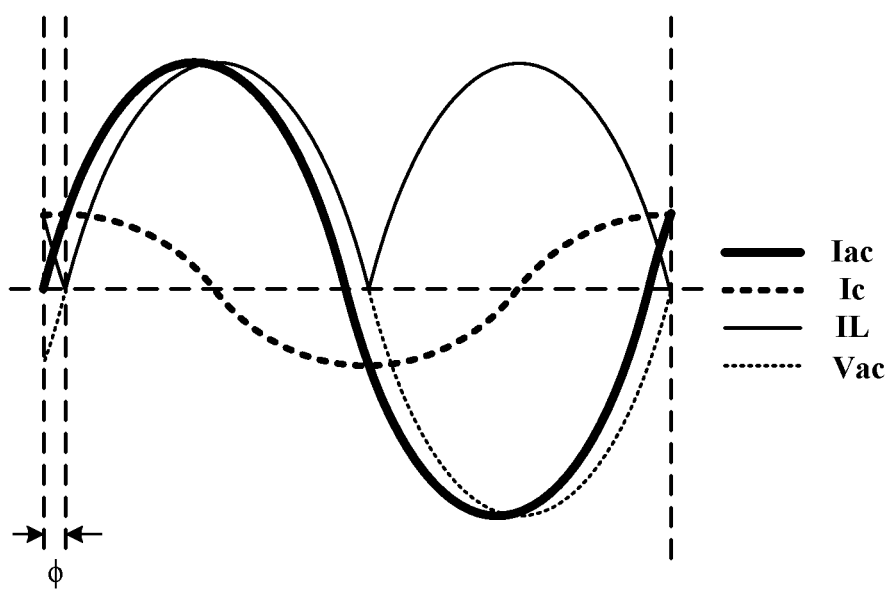
FIG. 3 is waveform diagram of example operation of a power stage circuit in a power factor correction circuit in an example control method.

Referring now to FIG. 3, shown is waveform diagram of example operation of a power stage circuit in a power factor correction circuit in an example control method. In this particular example, current reference signal Iref may have the same phase and shape as the absolute value |Vac| (e.g., Vin) of input AC voltage Vac of the power factor correction circuit. Also, the phase of current Ic shunted by capacitor Cemi may lead AC voltage Vac by 90°, and can satisfy Equation (1) below.

$$Iac = \begin{cases} Ic + IL, & Vac > 0 \\ Ic - IL, & Vac < 0 \end{cases} \quad (1)$$

Therefore, the phase of input AC current Iac may lead input voltage Vac, and if there is no compensation for the phase difference, the phase of input AC current Iac may lead input voltage Vac by phase difference φ related to capacitor Cemi. Because the value of current Ic is directly proportional to the capacitance of capacitor Cemi and input AC voltage Vac, for a power factor correction circuit provided with an EMI filter of fixed parameters and a constant input AC voltage, inductor current IL may be smaller when the power is lower, and the phase of input AC current Iac can be closer to the phase of current Ic. This can worsen power factor performance under light-load conditions in such power factor correction circuits. In addition, for different applications and products, the parameters of EMI filters that are set according to design requirements are typically not fixed. As a result, phase φ may change along with the parameters. Such solutions can thus only compensate the power factor reduction after the parameters of EMI filter 3 are determined.

Figure 4:
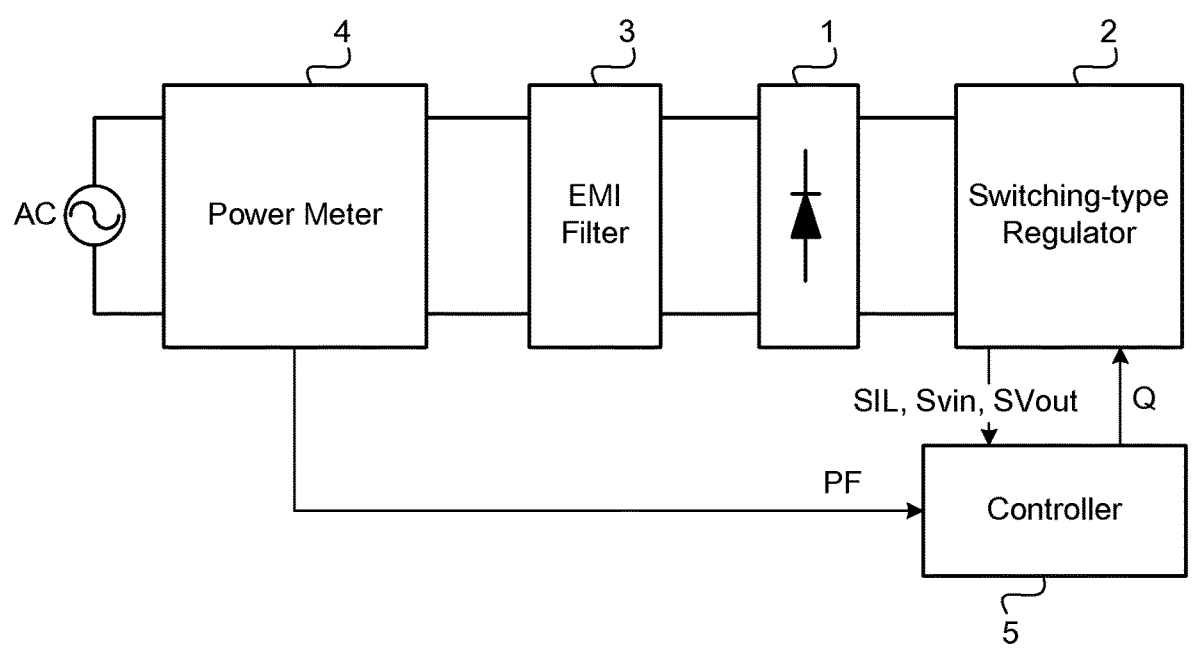
FIG. 4 is a schematic block diagram of an example power factor correction circuit, in accordance with embodiments of the present invention.

Referring now to FIG. 4, shown is a schematic block diagram of an example power factor correction circuit, in accordance with embodiments of the present invention. In this particular example, the power factor correction circuit can include rectifier circuit 1, switching-type regulator 2, EMI filter 3, power meter 4, and controller 5. Rectifier circuit 1 can convert the AC power to a DC power. Switching-type regulator 2 may be controlled by switching control signal Q to perform power factor correction. EMI filter 3 may be disposed between the AC side of rectifier circuit 1 and the input port, for isolating switching-type regulator 2 and AC input port AC. Power meter 4 can connect to the AC input port for measuring the power factor PF at the input port. Controller 5 can receive inductor current sampling signal SIL, input voltage sampling signal SVin, output voltage sampling signal SVout, and measured power factor PF of the switching-type regulator. Controller 5 can generate switching signal Q in order to correct the phase difference between the AC current and the AC voltage due to EMI filter 3, so as to maximize the power factor.

Inductor current sampling signal SIL can represent the inductor current of switching-type regulator 2. Input voltage sampling signal SVin can represent the input voltage Vin of switching-type regulator 2. Output voltage sampling signal SVout can represent output voltage Vout of switching-type regulator 2. Controller 5 can control the inductor current of switching-type regulator 2 to approach the expected inductor current represented by current reference signal Iref, in order to affect the AC power at the input port and perform the power factor correction operation. In this particular example, controller 5 may adjust current reference signal Iref that represents the expected inductor current according to measured power factor PF, in order to maximize the power factor. For example, the phase can initially be adjusted in the adjustment of current reference signal Iref.

Figure 5:
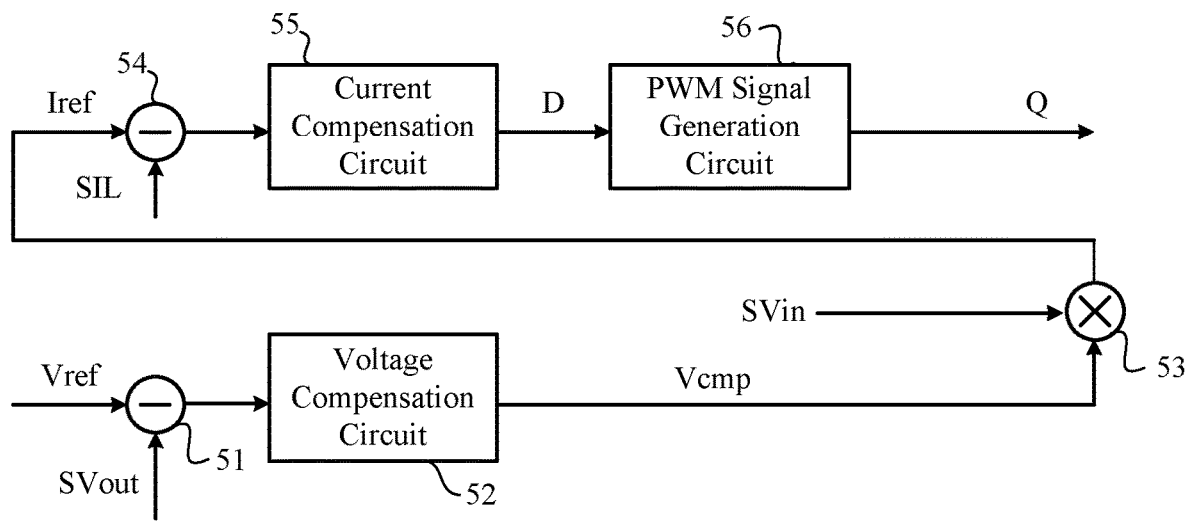
FIG. 5 is a diagram of an example data stream of an example controller.

Referring now to FIG. 5, shown is a diagram of an example data stream of an example controller. In this particular example, the controller can control inductor current IL in a closed loop. For example, output voltage Vout may be controlled in the voltage loop, and inductor current IL can be controlled in the current loop. The difference between output voltage sampling signal SVout and voltage reference signal Vref can be obtained by subtractor 51, and compensation signal Vcmp can be obtained by voltage compensation circuit 52. Further, compensation signal Vcmp may be multiplied by input voltage sampling signal Vin by way of multiplier 53.

The product signal output by multiplier 53 may be provided to subtractor 54 as current reference signal Iref. The difference between current reference signal Iref and inductor current sampling signal SIL can be obtained by subtractor 54 and compensated by current compensation circuit 54 to obtain signal D that represents the required duty cycle. Pulse-width modulation (PWM) signal generator 56 can generate switching control signal Q according to signal D that represents the required duty cycle. However, for the additionally introduced EMI filter, such a controller may not be able to fully compensate for the power factor reduction caused by the EMI filter prior to the parameters of the EMI filter being determined.

If switch-type converter 2 is controlled according to the current reference signal in some cases, because the power factor reduction caused by other factors may already be compensated, the power factor at the input port can mainly be affected by phase offset φ caused by the EMI filter. The phase offset can be calculated by measured power factor PF. Therefore, controller 5 can obtain the phase difference according to power factor PF, and accordingly control the phase of current reference signal Iref, in order to compensate the phase difference caused by the EMI filter. For example, because the effective value of the fundamental current substantially equals the effective value of the total current, PF=cos φ, where PF is the power factor of the circuit, and φ is the phase difference between the input voltage and the input current. The phase difference φ can be calculated by Equation (2) below if power factor PF can be measured by power meter 4.

$$\varphi = \arccos(PF) \quad (2)$$

Furthermore, the absolute offset time corresponding to the phase difference can be obtained as per Equation (3) below.

$$Td = \frac{\phi}{360} * T = \frac{\arccos(PF)}{360} * T \quad (3)$$

For example, Td is the offset time, PF is the measured power factor, and T is the period of the input AC power. In this way, controller 5 can delay the current reference signal by offset time Td, in order to maximize the power factor of the circuit, regardless of how the current reference signal is generated.

Figure 6:
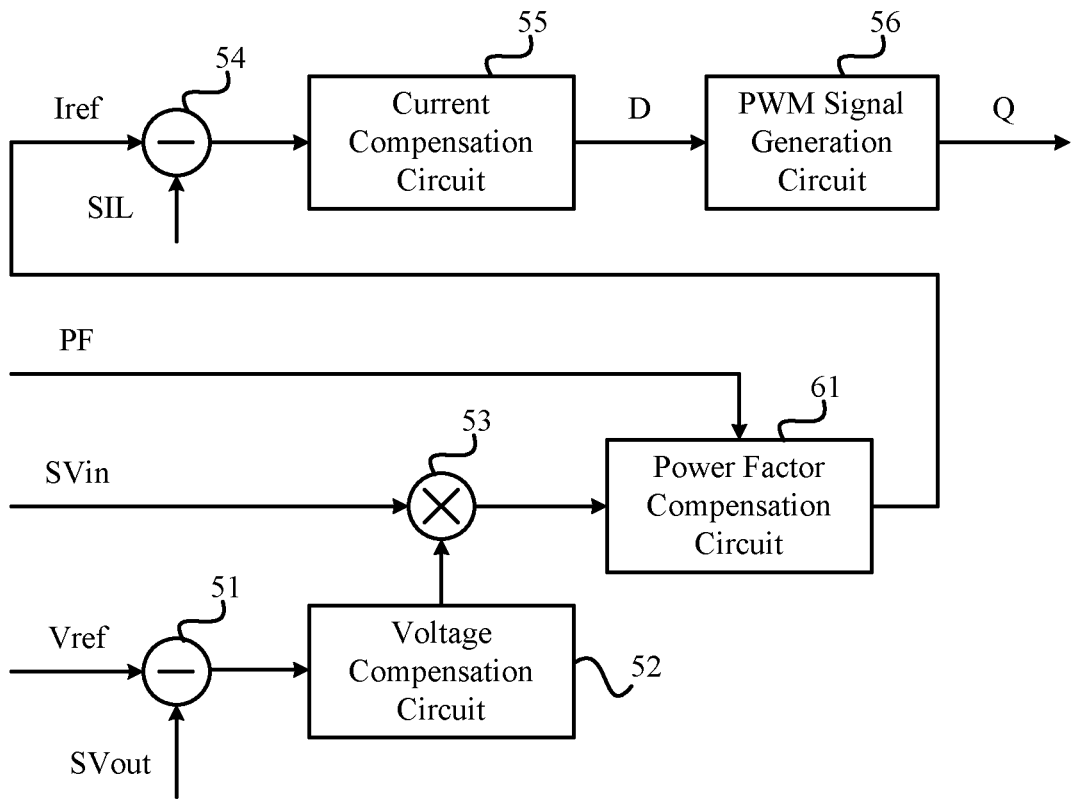
FIG. 6 is a diagram of an example data stream of an example controller, in accordance with embodiments of the present invention.

Referring now to FIG. 6, shown is a diagram of an example data stream of an example controller, in accordance with embodiments of the present invention. In this particular example, in addition to subtractor 51, voltage compensation circuit 52, multiplier 53, subtractor 54, current compensation circuit 55, and PWM signal generator 56, the controller can also include power factor compensation circuit 61. For example, the difference between output voltage sampling signal SVout and voltage reference signal Vref may be obtained by subtractor 51, and compensation signal Vcmp can be obtained by the voltage compensation circuit 52. Multiplier 53 can multiply input voltage sampling signal SVin and compensation signal Vcmp, and may provide a product of both to power factor compensation circuit 61.

Power factor compensation circuit 61 can calculate offset time Td according to the measured power factor PF based on the above formula, and may output current reference signal Iref to subtractor 54 by delaying product signal by offset time Td. Subtractor 54 can calculate the difference between current reference signal Iref and inductor current sampling signal SIL, and current compensation circuit 55 may provide signal D that represents the duty cycle of the switching control signal. PWM signal generating circuit 56 can generate switching control signal Q based on signal D, in order to control the switching-type regulator.

Figure 7:
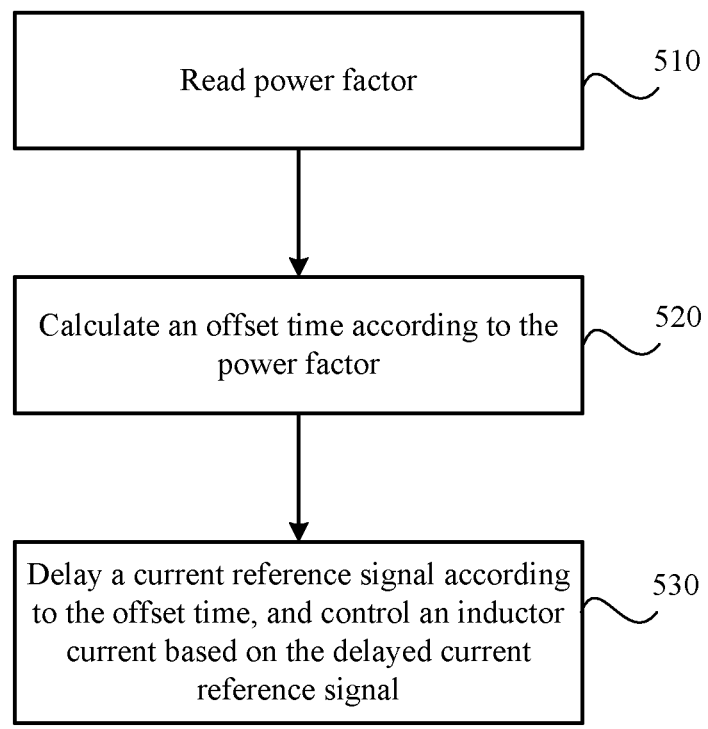
FIG. 7 is a flow diagram of an example control method, in accordance with embodiments of the present invention.

Referring now to FIG. 7, shown is a flow diagram of an example control method, in accordance with embodiments of the present invention. For example, the flow may be executed by power factor compensation circuit 61, and can include, at S510, reading the power factor PF. In this particular example, power factor PF may be obtained through a digital or analog port that is coupled to the power meter. At S520, offset time Td can be calculated according to power factor PF. At S530, the current reference signal may be delayed according to the offset time, and the inductor current can be controlled based on the delayed current reference signal. Because the control can be executed by directly measuring the feedback power factor, the controller can compensate the power factor reduction that may be caused by variety of different devices or sub-circuits without considering the parameters of some components in the circuitry.

It is also to be understood that the methods, processes, units, and circuits described herein may be implemented in various circuits or devices, and may also be embodied as codes and/or data stored on a readable storage medium and executed on physical circuitry/devices, such as a processor. In addition, controllers described herein can be implemented in a variety of ways. For example, these techniques can be implemented in hardware, firmware, software, or a combination thereof. For example, the controller may be implemented in one or more of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units or combinations thereof for carrying out the functions described herein. For firmware or software implementations, rate control techniques may be implemented with circuitry or modules (e.g., procedures, functions, etc.) that perform the functions described herein. These software codes can be stored in memory and executed by the processor. The memory can be within or external to the processor. In the latter case, the memory can be communicatively coupled to the processor in any suitable fashion.

Figure 8:
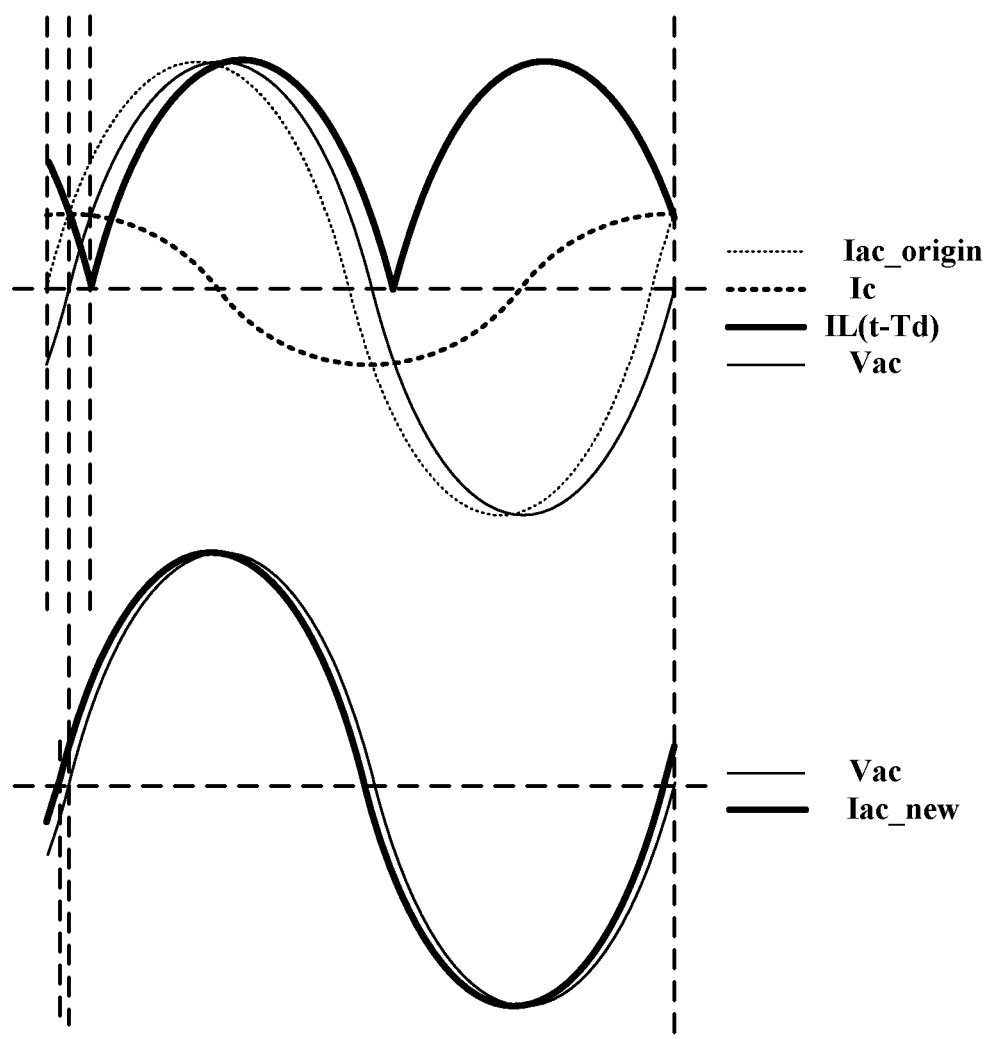
FIG. 8 is a waveform diagram of example operation of a power factor correction circuit, in accordance with embodiments of the present invention.

Referring now to FIG. 8, shown is a waveform diagram of example operation of a power factor correction circuit, in accordance with embodiments of the present invention. In this particular example, when the EMI filter with capacitors is provided at the input port, input AC current Iac can lead input AC voltage Vac. Controller 5 can control switch-type converter 2 to delay inductor current IL by offset time Td. For example, Iac_origin is the input AC current without compensation, Iac_new is the AC input current with compensation, and IL(t−Td) is the delayed inductor current. It can be seen that Iac_origin leads input AC voltage Vac by offset time Td in the case without compensation. The inductor current can be delayed in a current loop by delaying current reference signal Iref by offset time Td. On the basis of input voltage Vac, input current Iac_new can be obtained as per Equation (4) below.

$$\text{Iac\_new} = \begin{cases} Ic + IL(t - Td), & Vac > 0 \\ Ic - IL(t - Td), & Vac < 0 \end{cases} \quad (4)$$

Though the phase of input current Iac_new still leads input AC voltage Vac, the phase difference can be substantially reduced, and the power factor may be improved. The phase difference of the power factor correction circuit may be larger when the load is lighter. Thus, the circuit and control method of this example can achieve better results when the load is lighter.

Figure 9:
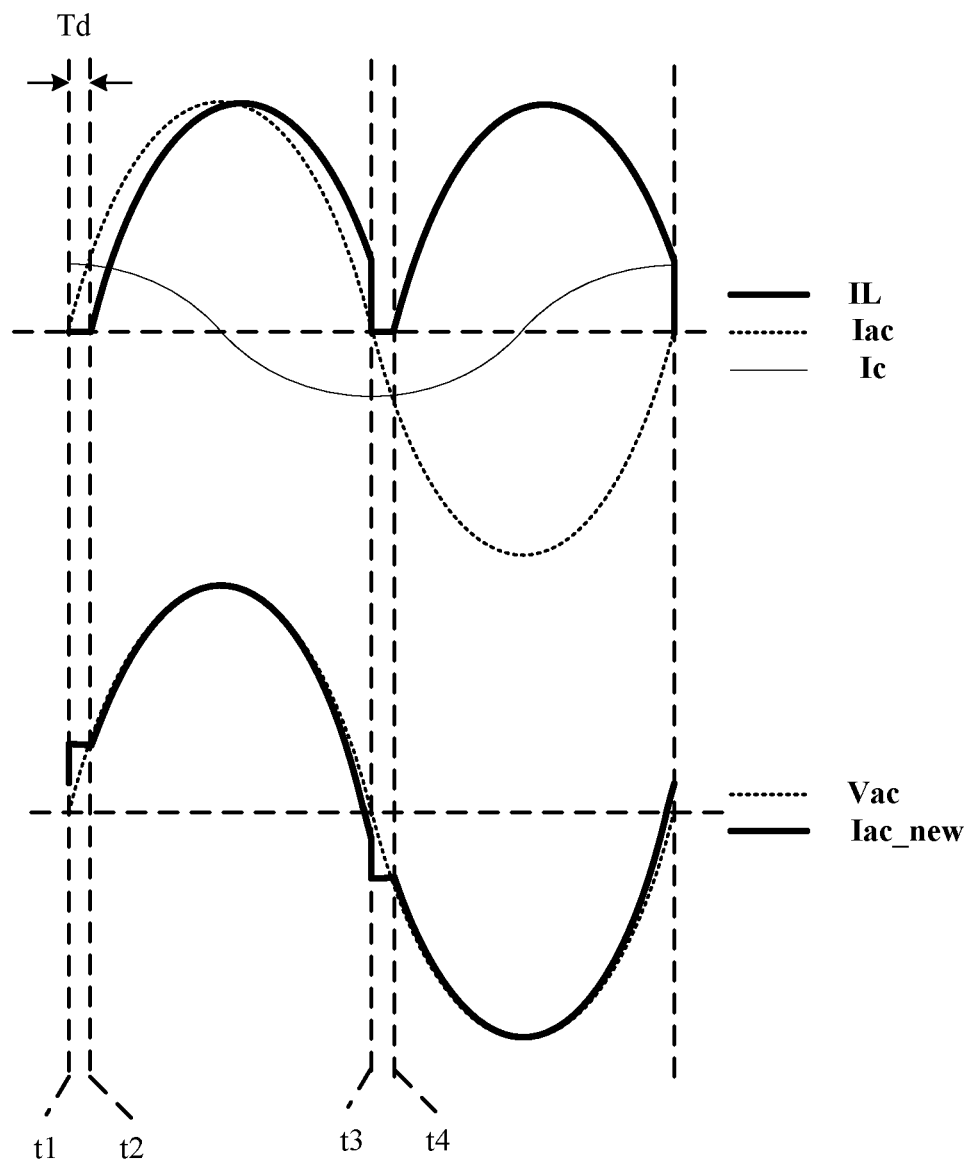
FIG. 9 is a waveform diagram of another example operation of a power factor correction circuit, in accordance with embodiments of the present invention.

Referring now to FIG. 9, shown is a waveform diagram of another example operation of a power factor correction circuit, in accordance with embodiments of the present invention. In this particular example, because delayed inductor current IL lags input AC voltage Vac, if compensated input AC current Iac has a similar phase as input AC voltage Vac, there are two time periods of time length Td in every AC period. That is, there are two time periods that last from the moment that input AC current Iac crosses zero to the moment that the inductor current crosses zero (e.g., time period t1-t2 and time period t3-t4). In these two time periods, the current input to rectifier circuit 1 can equal |Iac|−|Ic|<0, and the inductor current is not negative because of the rectification of rectifier circuit 1. Thus, inductor current IL can remain zero during the time periods.

As such, controller 5 can set the current reference signal to zero for a time period that continues for a duration of offset time Td after the input AC current crosses zero. That is, controller 5 can control current reference signal Iref to be zero during the time period that lasts from the moment that input AC current Iac crosses zero to the moment that the inductor current crosses zero when the current reference signal is regulated, in order to prevent the output of the current loop from saturating. The zero crossing detection of the input AC current can be realized by detecting the input AC current, or by detecting the input AC voltage (e.g., the input AC voltage has the same phase as the input AC current).

In response to the control of current reference signal Iref and the influence of the rectifier circuit, inductor current IL may be zero for two time periods with its length of Td in each period, such that input AC current Iac is maintained at a relatively constant value (e.g., equal to current Ic) for a corresponding time period, and forming a sinusoidal protruding step on the waveform. In this way, the power factor can be substantially increased as compared to an approach that does not delay the current reference signal. In particular embodiments, a current reference signal can be adjusted according to a measured power factor, and compensated for the phase changes of input AC current caused by the EMI filter, in order to maximize the power factor. Therefore, the power factor and the system efficiency can be effectively improved without calculating and designing the parameters of the specific EMI filter in advance.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A power factor correction circuit, comprising:
    a) a power meter configured to measure a power factor at an input port;
    b) a switching-type regulator that is controllable by a switching control signal in order to adjust said power factor of an input AC power;
    c) an electromagnetic interference (EMI) filter disposed between said switching-type regulator and said input port; and
    d) a controller configured to generate said switching control signal to control an operation state of said switching-type regulator to perform power factor correction according to said measured power factor, wherein said controller is configured to maximize said power factor by adjusting a phase of a current reference signal according to said measured power factor.

2. The power factor correction circuit of claim 1, wherein said current reference signal represents an expected inductor current of said switching-type regulator.

3. The power factor correction circuit of claim 1, wherein said controller is configured to control an inductor current of said switching-type regulator to approach said current reference signal.

4. The power factor correction circuit of claim 1, wherein said controller is configured to delay or advance said current reference signal by an offset time, wherein said offset time is obtained according to said measured power factor.

5. The power factor correction circuit of claim 4, wherein said controller is configured to adjust said current reference signal by delaying or advancing a product of a compensation signal and an input voltage sampling signal by said offset time.

6. The power factor correction circuit of claim 5, wherein said input voltage sampling signal represents an input voltage of said switching-type regulator, and said compensation signal represents a difference between a voltage reference signal and an output voltage of said switching-type regulator.

7. The power factor correction circuit of claim 4, wherein said offset time is obtained according to the formula $$Td = \frac{\arccos(PF)}{360} * T,$$

wherein Td is said offset time, PF is said measured power factor, and T is a period of said input AC power.

8. The power factor correction circuit of claim 4, wherein said controller is configured to set said current reference signal to zero in a time period that lasts from when an input AC current crosses zero to when said offset time has elapsed.

9. A method of controlling a switching-type regulator with power factor correction, the method comprising:
    a) measuring, by a power meter, a power factor at an input port;
    b) controlling said switching-type regulator by a switching control signal in order to adjust said power factor of an input AC power, wherein an electromagnetic interference (EMI) filter is disposed between said switching-type regulator and said input port; and
    c) generating, by a controller, said switching control signal to control an operation state of said switching-type regulator to perform power factor correction according to said measured power factor, wherein said controller maximizes said power factor by adjusting a phase of a current reference signal according to said measured power factor.

10. The method of claim 9, wherein said current reference signal represents an expected inductor current of said switching-type regulator.

11. The method of claim 9, further comprising controlling an inductor current of said switching-type regulator to approach said current reference signal.

12. The method of claim 9, wherein said current reference signal is delayed or advanced by an offset time, wherein said offset time is obtained according to said measured power factor.

13. The method of claim 12, wherein said adjusting said current reference signal comprises delaying or advancing a product of a compensation signal and an input voltage sampling signal by said offset time.

14. The method of claim 13, wherein said input voltage sampling signal represents an input voltage of said switching-type regulator, and said compensation signal represents a difference between a voltage reference signal and an output voltage of said switching-type regulator.

15. The method of claim 12, wherein said offset time is obtained according to $$Td = \frac{\arccos(PF)}{360} * T,$$

wherein Td is said offset time, PF is said measured power factor, and T is a period of said input AC power.

16. The method of claim 12, wherein said adjusting said current reference signal comprises setting said current reference signal to zero in a time period that lasts from when an input AC current crosses zero to when said offset time has elapsed.

* * * * *